(12) United States Patent
Nagata et al.

(10) Patent No.: US 7,556,435 B2
(45) Date of Patent: Jul. 7, 2009

(54) ROLLER BEARING APPARATUS, METHOD OF PRODUCING ROLLER BEARING APPARATUS AND COVER ATTACHED TO ROLLER BEARING APPARATUS

(75) Inventors: Syuji Nagata, Osaka (JP); Tomonari Nishiyama, Kashiwara (JP); Masaru Deguchi, Kashihara (JP)

(73) Assignee: JTEKT Corporation, Osaka-shi (JP)

( * ) Notice: Subject to any disclaimer, the term of this patent is extended or adjusted under 35 U.S.C. 154(b) by 254 days.

(21) Appl. No.: 11/354,244

(22) Filed: Feb. 15, 2006

(65) Prior Publication Data

US 2006/0228062 A1    Oct. 12, 2006

(30) Foreign Application Priority Data

Feb. 21, 2005 (JP) .............................. 2005-043850
Mar. 30, 2005 (JP) .............................. 2005-97252
Mar. 30, 2005 (JP) .............................. 2005-97313

(51) Int. Cl.
*F16C 19/08* (2006.01)
*G01P 3/48* (2006.01)

(52) U.S. Cl. ................................ 384/448; 324/207.25

(58) Field of Classification Search ......... 384/446–449, 384/544, 548; 324/173–174, 207.25; 474/144, 474/146; 74/606 R; 418/131, 149; 277/650
See application file for complete search history.

(56) References Cited

U.S. PATENT DOCUMENTS

| | | | | |
|---|---|---|---|---|
| 2,751,806 A | * | 6/1956 | Dickie | .................. 411/542 |
| 3,752,608 A | * | 8/1973 | Knowles et al. | .............. 418/131 |
| 4,498,709 A | * | 2/1985 | Wells et al. | .................. 301/5.24 |
| 4,723,619 A | * | 2/1988 | Yamamoto et al. | .......... 474/144 |
| 5,148,104 A | * | 9/1992 | Ishikawa | ..................... 324/173 |
| 5,296,805 A | * | 3/1994 | Clark et al. | .................. 324/174 |
| 5,756,894 A | * | 5/1998 | Paolo et al. | .................. 384/448 |
| 5,814,984 A | * | 9/1998 | Ohmi et al. | .................. 324/173 |
| 6,079,966 A | * | 6/2000 | Bearint et al. | ............... 418/149 |
| 6,127,819 A | * | 10/2000 | Ouchi | ......................... 324/173 |
| 6,218,827 B1 | | 4/2001 | Ohmi et al. | |

(Continued)

FOREIGN PATENT DOCUMENTS

EP    751311 A1 * 1/1997

(Continued)

OTHER PUBLICATIONS

Partial European Search Report of EP06003430 mailed on Apr. 19, 2005.

(Continued)

*Primary Examiner*—Marcus Charles
(74) *Attorney, Agent, or Firm*—Westerman, Hattori, Daniels & Adrian, LLP.

(57) ABSTRACT

A roller bearing apparatus provided with a roller bearing having an outer ring with a cylindrical opening that opens at one end and a cover fitted in the opening against the inner periphery thereof to close it. The cover is provided with an inscribing surface that inscribes the. inner periphery of the opening and a stepped surface that protrudes radially outward from the inscribing surface to abut the axial end face of the opening. The axial end face of the opening is provided with a beveled part on the inner rim. An annular space formed by the beveled part, inscribing surface, and stepped surface is filled with sealant.

10 Claims, 11 Drawing Sheets

U.S. PATENT DOCUMENTS

| | | | |
|---|---|---|---|
| 6,254,276 B1 * | 7/2001 | Ouchi et al. | 384/448 |
| 6,338,688 B1 * | 1/2002 | Minami et al. | 474/144 |
| 6,370,838 B1 * | 4/2002 | Evason et al. | 52/786.13 |
| 6,523,834 B2 * | 2/2003 | Philipson | 277/650 |
| 2003/0110718 A1 * | 6/2003 | Boisvert | 52/208 |

FOREIGN PATENT DOCUMENTS

| | | | |
|---|---|---|---|
| EP | 1811306 A1 * | 7/2007 | |
| JP | 07243448 A * | 9/1995 | |
| JP | 09166136 A * | 6/1997 | |
| JP | 11118817 A * | 4/1999 | |
| JP | 2001-318105 A | 11/2001 | |
| JP | 2003-013982 A | 1/2003 | |
| JP | 2004-76753 | 3/2004 | |

OTHER PUBLICATIONS

European Search Report dated Nov. 3, 2006 issued in corresponding European Patent Application No.06003430.3.

* cited by examiner

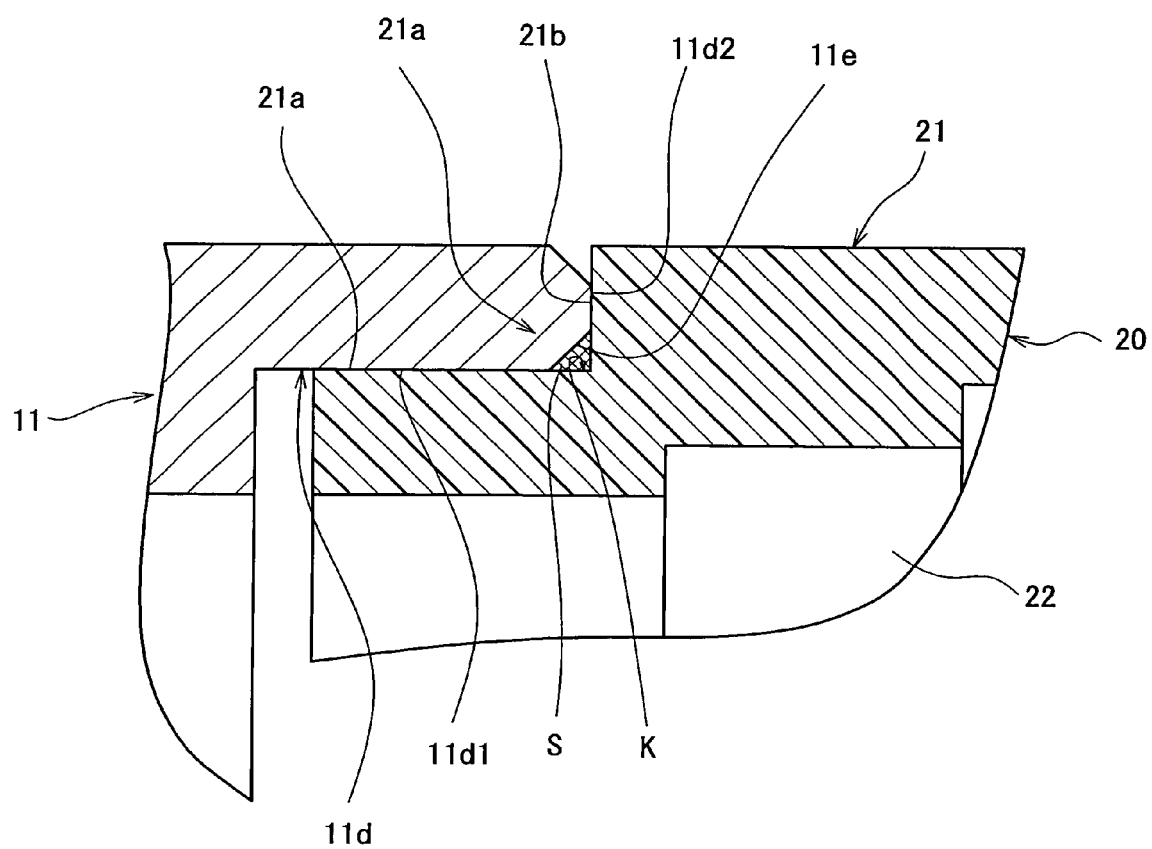

ROLLER BEARING APPARATUS, METHOD OF PRODUCING ROLLER BEARING APPARATUS AND COVER ATTACHED TO ROLLER BEARING APPARATUS

BACKGROUND OF THE INVENTION

The present invention relates to a roller bearing apparatus, a method of producing the roller bearing apparatus, and a cover attached to the roller bearing apparatus.

Some roller bearing apparatuses that support wheels, for example, of vehicles are provided with a rotation number detector that detects the rotating speed of the wheel for controlling the anti-lock brake system and the like. Such roller bearing apparatuses are provided for example, as shown in FIG. 11, with a roller bearing comprising an inner ring 51 as a rotary ring that co-rotates with a flange 50 to which a wheel is attached and an outer ring 52 that interposes multiple rolling elements between itself and the inner ring 51 and is attached to a vehicle body, and a closed-end cylindrical cover 54 attached to the outer ring 52 and carrying a rotation number detector 53 that detects the rotation number of a wheel. An end 54a of the cover 54 is fitted in the outer ring 52 against its inner periphery so as to close the opening of the outer ring 52 at one end.

If muddy water or foreign substances enter the interior of the roller bearing apparatus described above, the roller bearing apparatus deteriorates in terms of durability or detection accuracy of the rotation number detector 53. Therefore, the end 54a of the cover 54 is pressed in the outer ring 52 against its inner periphery for increased sealing.

The cover is conventionally produced by pressing a metal plate. However, synthetic resin covers produced by injection molding using a metal mold have been recently proposed in place of metal covers in order to reduce the cost (for example, see Japanese Unexamined Patent Publication No. 2001-318105).

However, using a synthetic resin cover has the following problems.

The synthetic resin cover 54 and metal outer ring 52 have different thermal expansion coefficients. When the temperature of the roller bearing apparatus rises, a small clearance may occur between the outer ring 52 and the cover 54, deteriorating the seal.

When there is clearance between the inner periphery 52a of the outer ring 52 and the outer periphery 54a1 of the opening end 54a, there has been proposed to form a groove 54b at the outer periphery 54a1 for creating a labyrinth effect together with the clearance, thereby preventing muddy water from entering the interior of the roller bearing (for example, see Japanese Unexamined Patent Publication No. 2004-76753).

However, the roller bearing apparatus described in Japanese Unexamined Patent Publication No. 2004-76753 still allows a small clearance between the inner periphery 52a and the outer periphery 54a1, making it desirable to improve the sealing between the inner periphery 52a and the outer periphery 54a1 in order to ensure durability.

In some prior art bearing apparatuses, the cover is provided with a sensor mount having a seating face as a sensor-mounting reference level. Abutting the seating face, a sensor is mounted on the sensor mount, by which the sensor and an encoder that is attached to and co-rotates with the rotary ring are provided at a specific distance. However, in the synthetic resin cover, some forms of the sensor mount may sink (deform) as a result of thermal contraction of the synthetic resin in the course of molding, and the seating face of the sensor mount of the prior art cover will not be accurately formed, requiring post processing in order to use the seating face as a sensor-mounting reference level. Specifically, a tilted seating face resulting from such deformation must be, for example, flattened to a level seating face by means of cutting and the like.

Known structures for mounting a sensor include a sensor insertion opening formed in the cover through which a sensor body is inserted. In such case, the sensor is provided with a flange and a cap nut is embedded in the cover, and the flange is fixed to the cover with a bolt with the use of the cap nut (for example, see Japanese Unexamined Patent Publication No. 2003-13982). The end face of the cap nut and the cover surface are in one plane (so-called leveled), to which the sensor flange is abutted and bolted.

In the mounting structure described in Japanese Unexamined Patent Publication No. 2003-13982, the sensor is fixed by a bolt at the flange, so that secure fixation of the sensor is performed as compared to a sensor having no flange. When the cover is made of synthetic resin, the cap nut is easily placed in the cover by insert resin molding, which allows the cover to be produced at reduced cost. Further, the cap nut to be embedded in the cover is easily immobilized therein. The sensor flange is abutted to the cover surface, so that the sensor is axially positioned with increased accuracy as compared to a sensor having no flange.

However, being made of a synthetic resin, the cover easily sinks or warps in the course of molding. Therefore, when the flange is abutted to the cover, the sensor may be tilted or axially dislocated by the warpage of the cover, problematically deteriorating the sensor gap accuracy.

SUMMARY OF THE INVENTION

The present invention is made in view of the above circumstances and an object thereof is to provide a roller bearing apparatus that resolves the problems associated with a synthetic resin cover, a method of producing the roller bearing apparatus, and a cover that is attached to the roller bearing apparatus.

In other words, the object of the present invention is to provide a roller bearing apparatus having improved sealing between the roller bearing and the cover to prevent muddy water from entering the interior and ensure durability and a method of producing the roller bearing apparatus.

Another object of the present invention is to provide a roller bearing apparatus cover having a sensor mount with a seating face formed with high accuracy without post-processing and a roller bearing apparatus using the cover.

Still another object of the present invention is to provide a roller bearing apparatus in which a cap nut is provided in a synthetic resin cover and the cap nut is used to fix the sensor to the flange for positioning the sensor with improved accuracy.

The roller bearing apparatus according to a first aspect of the present invention is a roller bearing apparatus including a roller bearing having an outer ring with a cylindrical opening that opens at one end and a cover that is fitted in the opening against the inner periphery thereof to close the opening, the cover having an inscribing surface that inscribes the inner periphery of the opening and a stepped surface that protrudes radially outward from the inscribing surface to abut the axial end face of the opening, characterized by the fact that a beveled part is formed on the axial end face of the opening at the inner rim, and an annular space formed by the beveled part, inscribing surface, and stepped surface is filled with sealant.

In the roller bearing apparatus having the above structure, the annular space is filled with sealant and, therefore, the sealant is interposed between the outer ring and the cover, which can close and seal the opening of the outer ring. The beveled part is conventionally formed in producing an outer ring. There is no need of additional processing, such as forming a groove, as required in the prior art. Consequently, a seal can be provided between the cover and the outer ring without a significant increase in cost.

A variety of techniques can be used to interpose sealant between the outer ring and the cover, including the following method.

The method of producing the roller bearing apparatus according to a first aspect of the present invention is a method of producing the roller bearing apparatus wherein the inscribing surface of the cover is inserted in a cylindrical opening of the outer ring of the roller bearing against the inner periphery of the opening from one axial end to the other to close the opening of the outer ring, characterized by the fact that the inscribing surface of the cover is inserted in the opening against the inner periphery with the sealant being applied along the entire circumference of the inscribing surface.

Pushed by the axial end face of the opening (the beveled part), most of the sealant applied to the inscribing surface is shifted toward a base of the stepped surface. The axial end face and stepped surface abut each other, by which most of the sealant fills the annular space. While the sealant is shifted to the base of the stepped surface, a small amount of the sealant is spread over the end periphery of the outer ring and the inscribing surface, thereby interposing sealant between these surfaces. Accordingly, sealant-interposing area is extended, which ensures a seal between the outer ring and the cover.

The roller bearing apparatus cover according to a second aspect of the present invention is a synthetic resin cover formed by molding, closing off the interior of a roller bearing apparatus including a fixed ring and a rotary ring, and having a sensor mount on which a sensor can be mounted to face an encoder co-rotatably attached to the rotary ring for detecting the movement of the rotary ring, characterized by the fact that:

the cover is provided with a partition that partitions the interior of the roller bearing apparatus from the exterior;

the sensor mount is provided with a seating face constituting a reference level for mounting the sensor on one of the inner and outer end faces of the partition; and ribs are provided on one end face to form specific recesses on one end face together with the sensor mount.

The roller bearing apparatus according to a second aspect of the present invention is a roller bearing apparatus comprising a fixed ring and a rotary ring, and a synthetic resin cover formed by molding and having a sensor mount on which a sensor can be mounted so as to face an encoder co-rotatably attached to the rotary ring for detecting the movement of the rotary ring, characterized by the fact that:

the cover is provided with a partition that partitions the interior of the roller bearing apparatus from the exterior;

the sensor mount is provided with a seating face constituting a reference level for mounting the sensor on one of the inner and outer end faces of the partition; and ribs are provided on one end face to form specific recesses on one end face together with the sensor mount.

In the roller bearing apparatus cover having the above structure and the roller bearing apparatus using this cover, the seating face of the sensor mount is formed on one of the inner and outer end faces of the partition and the ribs are provided to form specific recesses on one end face together with the sensor mount. Because of the recesses, the amount of synthetic resin on the end face is reduced, preventing the seating face of the sensor mount from being deformed due to thermal contraction of the synthetic resin in the course of producing the cover by molding.

The sensor mount and ribs of the above roller bearing apparatus cover can be integrally formed on the one end face.

In such case, the seating face can be formed with high accuracy without complicating a mold shape compared to the case where the sensor mount and ribs are provided separately. In the completed cover, the sensor mount is reinforced by the ribs, preventing the mounting geometry from being deformed.

The roller bearing apparatus according to a third aspect of the present invention is a roller bearing apparatus including an outer ring; an inner ring member provided on an inner periphery side of the outer ring via rolling elements; an inner shaft having the inner ring member attached on the outer periphery, and a flange for mounting a wheel at one axial end; a detection member provided on the inner ring or the inner shaft, which co-rotates with the wheel, for detecting the rotation; a synthetic resin cover attached to the outer ring at the other axial end; a sensor insertion opening provided through the cover in the axial direction; and a cap nut embedded in the cover with a nut end face being exposed for fastening a sensor flange of a sensor to the cover on the other axial end side, characterized by the fact that the nut end face of the cap nut is positioned on the other axial end side of the outer cover surface facing the sensor flange.

In the third aspect of the present invention, the nut end face (the other axial end side end face) of a cap nut and the cover surface are not on one plane (not leveled), unlike the prior art. The nut end face of the cap nut is positioned on the other axial end side of the outer cover surface facing the sensor flange. Consequently, the flange of the sensor (sensor flange) is in contact with the nut end face of the cap nut, but substantially not in contact with the outer cover surface. Therefore, the sensor is less influenced by sinkage or warpage of the cover, preventing the sensor from tilting or dislocating.

BRIEF DESCRIPTION OF THE DRAWINGS

FIG. 2 is an enlarged view of the insertion of an outer ring and a cover in FIG. 1;

DETAILED DESCRIPTION

Embodiments of the roller bearing apparatus of the present invention, the method of producing the roller bearing apparatus, and the cover that is attached to the roller bearing apparatus are described hereafter with reference to the drawings.

Figure 1:
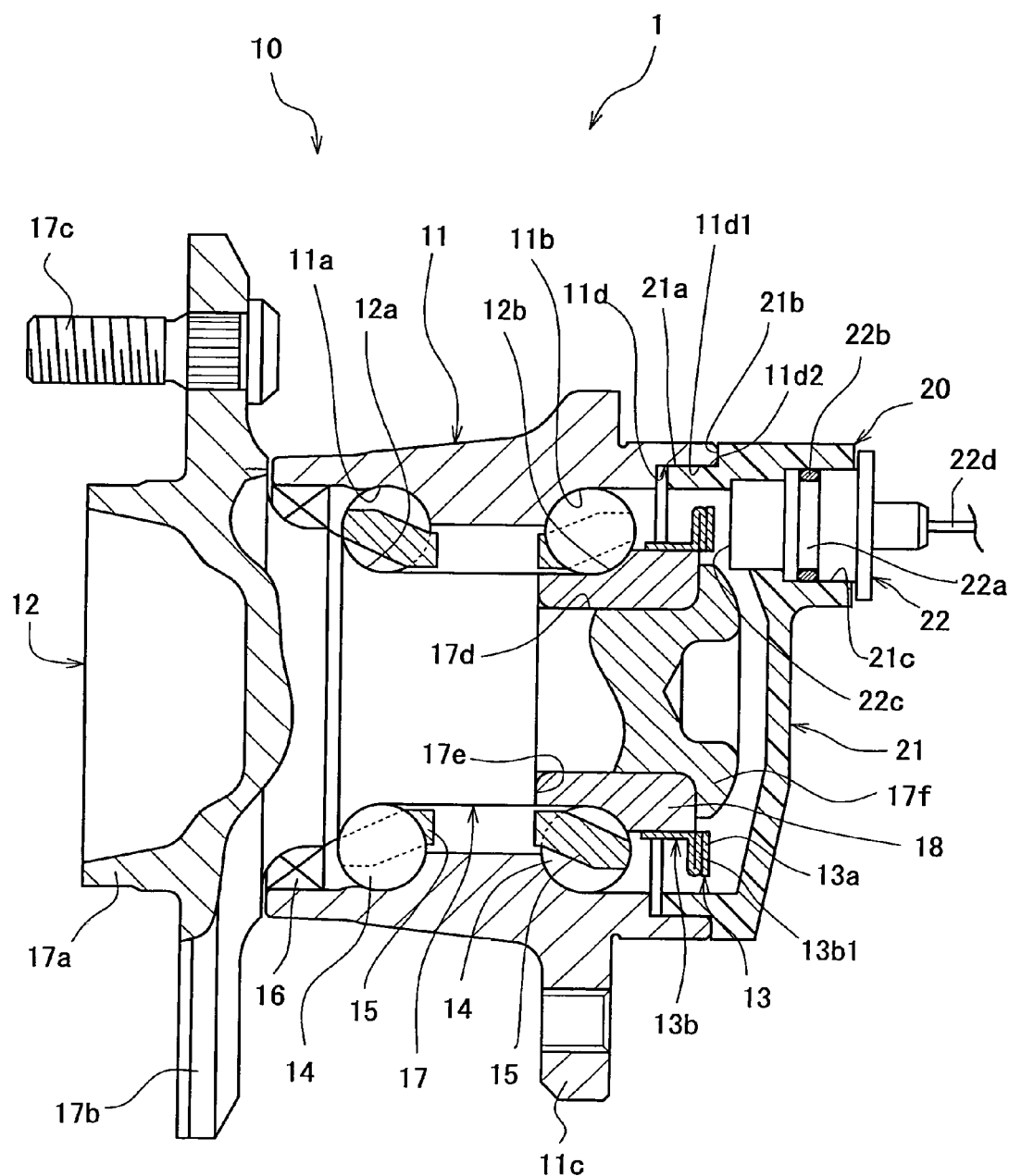
FIG. 1 is an axial cross-sectional view showing a structure of a roller bearing apparatus according to a first aspect of the present invention.

FIG. 1 is an axial cross-sectional view showing the structure of a roller bearing apparatus (wheel bearing apparatus) according to a first aspect of the present invention. A wheel bearing apparatus 1 is used to rotatably support a wheel of a vehicle such as a car. The wheel bearing apparatus 1 comprises a roller bearing 10 that supports a wheel of a vehicle to which the wheel bearing apparatus 1 is attached and a cover 20 that closes the roller bearing 10 at one end.

First, the roller bearing 10 is described. The roller bearing 10 is a double-row angular ball bearing, comprising an outer ring 11 as a fixed ring, an inner ring 12 as a rotary ring, an encoder 13 attached to the inner ring 12, multiple balls 14 as rolling elements provided between the outer and inner rings 11 and 12, holder 15 holding each of the balls 14, and a seal 16 provided in the clearance between the outer and inner rings 11 and 12 for sealing off the bearing interior.

The inner ring 12 constitutes an axle to which an un-shown wheel is attached. The inner ring 12 consists of an inner shaft 17 and an inner ring member 18.

The inner shaft 17 is provided with a socket part 17a and a flange 17b for mounting a wheel at one end. Multiple hub bolts 17c are fixed to the flange 17b for fastening the wheel.

The inner shaft 17 is provided with a first inner ring track 12a on the outer periphery and, at the other end, a small-diameter part 17d having a diameter smaller than the inner ring track 12a. Having an annular form, the inner ring member 18 is press fitted on the small-diameter part 17d. A second inner ring track 12b is formed on the outer periphery of the inner ring member 18. The inner ring member 18 is press fitted in with one end face abutting a step 17e that connects the outer periphery of the inner ring body 17 and the small-diameter part 17d. A caulked part 17f is formed by caulking the tip of the small-diameter part 17d while the inner ring member 18 is pushed in, by which the inner ring member 18 is co-rotatably fixed to the inner shaft 17 while applying preload to the bearing 10.

The outer ring 11 is provided, on the inner periphery, with a first outer ring track 11a and a second outer ring track 11b corresponding to the first and second inner ring tracks 12a and 12b, respectively, to rotatably support the inner ring 12 via balls 14. The outer ring 11 is provided, on the outer periphery, with a mount 11c for attaching the outer ring 11 to a vehicle. Further, the outer ring 11 is provided with a cylindrical opening 11d having a large-diameter surface 11d1 having a diameter larger than the second outer ring track 11b at the axial end opposite to the flange 17b.

The encoder 13 consists of an annular magnetic ring 13a and an annular supporting member 13b to which the magnetic ring 13a is attached. With the supporting member 13b fitted on the inner ring member 18 at the end, the encoder 13 is co-rotatably attached to the inner ring 12. The supporting member 13b is formed by bending a metal plate into an overall annular shape having an approximately L-shaped cross-section. The magnetic ring 13a is bonded to the annular part 13b1 of the supporting member 13b, for example, using adhesive in a manner in which different magnetic poles are continuously arranged in the circumferential direction.

The cover 20 is described in detail hereafter. The cover 20 is provided with a cover body 21 attached to the outer ring 11 and a rotation number detector 22 attached to the cover body 21 with the tip being close to the encoder 13.

Made of a synthetic resin, the cover body 21 is provided with a nearly cylinder form with a closed-end. The open end of the cover body 21 is inserted in the large-diameter part 11d1 of the opening 11d of the outer ring 11 to close the opening 11d. The cover body 21 is provided with at the open end an inscribing surface 21a that is a cylindrical surface having a diameter smaller than the outer periphery of the cover body 21 and inscribes the large-diameter surface 11d1, and a stepped surface 21b that connects the inscribing surface 21a to the outer periphery of the cover body 21 (protruding radially outward from the inscribing surface 21a along the circumference). Inserted in the larger-diameter surface 11d1, the cover body 21 is axially positioned with the stepped surface 21b abutting the axial end face 11d2 of the opening 11d of the outer ring 11. The diameter of the inscribing surface 21a is determined so that the inscribing surface 21a inscribes the large-diameter surface 11d1 with an appropriate interference.

The cover body 21 is provided, at the bottom, with a bore 21c that communicates the interior of the cover 21 with the exterior. The rotation number detector 22 is inserted and fixed in the bore 21c. The rotation number detector 22 is provided with a cylindrical shape that fits the inner periphery of the bore 21c. A groove 22a is formed on the outer periphery of the rotation number detector 22 in the circumferential direction and a sealing ring 22b is fitted therein to provide the sealing between the bore 21c and the rotation number detector 22. The rotation number detector 22 is fixed with the tip 22c being in the vicinity of the encoder 13, thereby detecting magnetic field changes caused by the magnetic ring 13a of the encoder 13. The rotation speed detector 22 outputs signals indicating the detected magnetic field changes from a harness 22d to an un-shown controller. The controller can obtain the wheel rotation speed based on the signals.

The insertion of the outer ring 11 and cover 20 are described in detail hereafter. FIG. 2 is an enlarged view of the insertion of the outer ring 11 and cover 20 shown in FIG. 1.

The outer ring 11 is provided with a beveled part 11e on the axial end face 11d2 at the rim along the entire circumference. The beveled part 11e is formed by so-called C beveling to remove the edge of the axial end face 11d2. The beveling rate is approximately 0.5 to 1 mm. The beveled part 11e as described above is generally formed in cutting a metal material and the beveled part 11e of this embodiment is one of those generally formed. In FIG. 2, the beveled part 11e is shown in an exaggerated manner for explanation.

An annular space K is formed by the beveled part 11e, inscribing surface 21a, and stepped surface 21b at the base of the stepped surface 21b. The annular space K is filled with sealant S to provide a seal between the outer ring 11 and the cover 20. The sealant used here can be Locktight 5910 (trade name) of Henkel. Locktight 5910 (trade name) is a room temperature curing paste sealant.

Filled and cured between the beveled part 11e, inscribing surface 21a, and stepped surface 21b, the sealant S joins and seals them tightly with an appropriate adhesion force so that they can be separated. The sealant S cures with an appropriate elastic property. Therefore, when a clearance occurs between the inscribing surface 21a. and the large-diameter surface 11d1 as a result of difference in thermal expansion coefficient between the outer ring 11 and the cover 20, the elasticity of the sealant S allows for clearance and maintains the sealed state.

In the vehicle bearing apparatus 1 of this embodiment having the above structure, the sealant S is filled in the annular space K and interposed between the outer ring 11 and the cover 20, by which the cover 20 can close the opening 11d of the ring 11 in a sealed state, preventing muddy water and the like from entering the interior of the vehicle bearing apparatus 1, thus ensuring its durability and preventing the detection accuracy of the rotation number detector 22 from deteriorating.

Figure 3A:
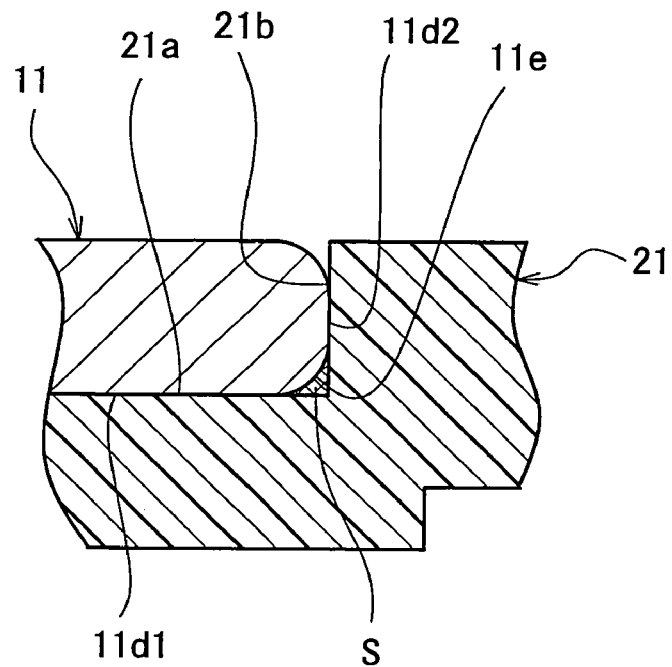
FIG. 3 shows variations of the cross-section of the beveled part of the opening.
Figure 3B:
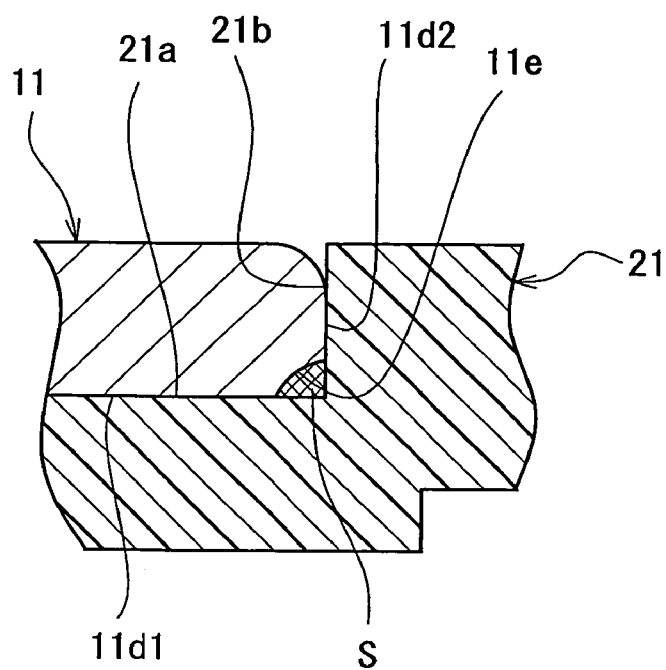

The beveled part 11e is formed in the prior art and there is no need of additional process such as grooving, as required in the prior art embodiment described above. Therefore, the sealing between the cover 20 and the outer ring 11 can be accomplished without a significant increase in cost. For filling more sealant, the beveled part 11e can be formed at a larger beveling rate or the beveled part 11e can be an R-bevel as shown in FIG. 3a or a recessed R-bevel as shown in FIG. 3b.

The sealant S connects the beveled part 11e, inscribing surface 21a, and stepped surface 21b with an appropriate adhesive force so that they can be separated. Therefore, the cover 20 can be easily removed from the roller bearing 10, for example, on disassembly for maintenance.

Various techniques are available for interposing the sealant S between the outer ring 11 and the cover 20.

The following technique can be used in the method of producing the vehicle bearing apparatus 1 of this embodiment.

Figure 4:
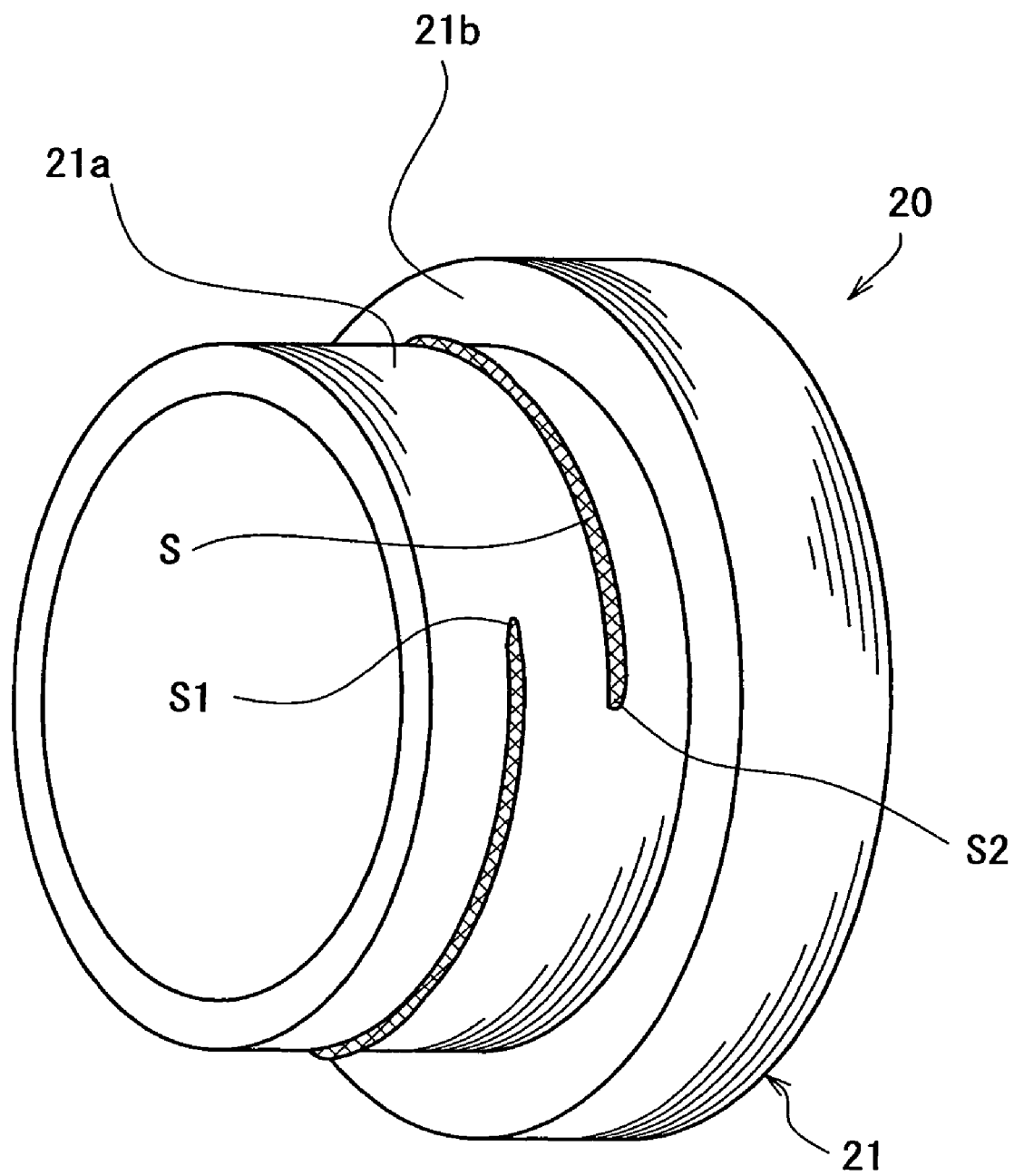
FIG. 4 is a perspective view of the cover before it is inserted in the outer ring.

FIG. 4 is a perspective view of the cover 20 before it is inserted in the outer ring 11. As shown in the figure, the sealant S is applied to the inscribing surface 21a nearly in the center in the axial direction in the form of a circumferential ridged streak having two ends. The sealant S applied in the form of a ridged streak having two ends runs along the entire circumference of the inscribing surface 21a and the ends S1 and S2 overlap seen in the axial direction. Then, the cover 20 is inserted in the large-diameter surface 11d1 of the outer ring 11.

The method of producing the vehicle bearing apparatus of the embodiment described above has the following effects when the cover 20 is attached to the outer ring 11. Most of the sealant S applied in a ridge form is pushed by the axial end face 11d2 of the outer ring 11 (the beveled part 11e) and shifted toward the base end of the stepped surface 21b. When the axial end face 11d2 abuts the stepped surface 21b, most of the sealant S is filled in the annular space K. While the sealant S is shifted to the base end of the stepped surface 21b, a small amount of the sealant S is extended over the large-diameter surface 11d1 and, therefore, the sealant S is interposed between the large-diameter surface 11d1 and the inscribing surface 21a. In this way, the sealant S interposed over an extended area ensures a seal between the outer ring 11 and the cover 20.

The ends S1 and S2 of the sealant S applied in a ridge form overlap seen in the axial direction, so that the sealant S is interposed along the entire circumference with no gap.

In the embodiment described above, the sealant S can be applied to the inscribing surface 21a in an amount more than necessary to fill the annular space K with no problems. However, it is preferable that the sealant S be applied in an amount necessary and sufficient to fill the annular space K. This is because the sealing between the outer ring 11 and cover 20 is provided as long as the annular space K is filled with the sealant S and any more sealant S is redundant.

In this embodiment, the sealant S is applied in a ridged streak. However, it can be applied to the inscribing surface 21a in a flat form. The inscribing surface 21a is provided with an appropriate interference relative to the large-diameter surface 11d1 and the clearance between the inscribing surface 21a and the large-diameter surface 11d1 is very small. Even if the sealant S is applied in a flat form, the axial end face 11d2 sweeps and pushes the sealant S toward the base of the stepped surface 21b.

The present invention is not restricted to the embodiment described above. For example, the present invention is applied to a vehicle bearing apparatus having a rotation number detector in the embodiment. However, it can be applied to a vehicle bearing apparatus having no rotation number detector. The present invention is applicable not only to a vehicle bearing apparatus but also to a general industrial roller bearing apparatus as long as it is structured with a cover inserted in an opening thereof to close the end opening.

The cover and roller bearing apparatus according to a second aspect of the present invention is described hereafter.

Figure 5:
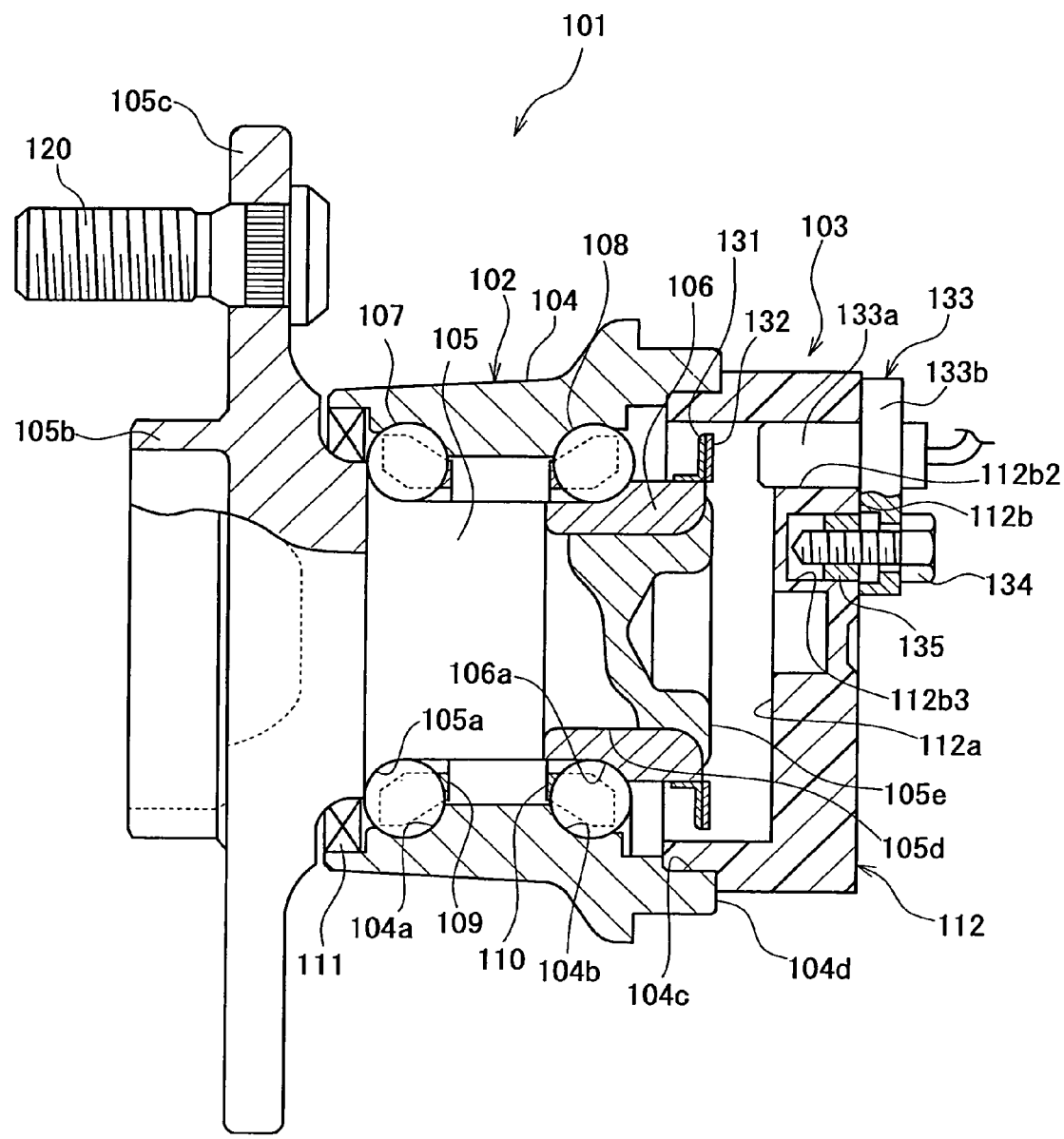
FIG. 5 is an axial cross-sectional view of a roller bearing apparatus to which the cover according to a second aspect of the present invention is attached.

FIG. 5 is an axial cross-sectional view of a roller bearing apparatus to which the cover according to the second aspect of the present invention is attached. In FIG. 5, the inner side of a vehicle is to the right and the outer side (wheel side) of the vehicle is to the left. A sensor-equipped roller bearing apparatus 101 comprises a roller bearing unit 102 and a sensor unit 103. The roller bearing unit 102 is of a double-row angular ball bearing type, comprising an outer ring 104, an inner shaft (hub wheel) 105 and an inner ring member 106 as an inner ring, and rolling elements 107 and 108 consisting of multiple balls. The roller bearing unit 102 has holders 109 and 110 that hold the rolling elements 107 and 108, respectively, at specific intervals in the circumferential direction and a seal member 111 provided in a clearance between the outer ring 104 and the inner shaft 105. Further, the roller bearing unit 102 is provided with a cover 112 of the present invention to close off the bearing interior on the vehicle inner side of the outer ring 104. The cover 112 seals the annular opening between the inner and outer rings from the vehicle inner side and, together with the seal member 111 that seals the annular opening from the vehicle outer side, prevents muddy water and foreign substances from entering the bearing interior.

The outer ring 104 is a fixed ring that is fastened to the vehicle and has multiple rows of outer ring tracks 104a and 104b on the inner periphery. On the other hand, the rotary ring consists of the inner shaft 105 and inner ring member 106. The inner shaft 105 is provided with an inner ring track 105a in a position corresponding to the outer ring track 104a, where the rolling element 107 rotates between the inner and outer ring tracks 105a and 104a. The inner ring member 106 is provided with an inner ring track 106a in a position corresponding to the outer ring track 104b, where the rolling element 108 rotates between the inner and outer ring tracks 106a and 104b.

The inner shaft 105 is provided with a socket part 105b and a flange 105c for mounting a wheel on the vehicle outer side. Multiple hub bolts 120 are pressed in the flange 105c to fasten a wheel. The inner shaft 105 is provided with a step 105d on the vehicle inner side. The inner ring member 106 is fitted on the step 105d. The inner ring member 106 is fixed to the inner shaft 105 by a caulked part 105e formed by bending the tip of the step 105d radially outward.

The sensor unit 103 includes, for example, a polarized pulsar ring 132 and a sensor 133 facing the ring 132. The rotation speed of the wheel is detected by detecting the rotation number of the roller bearing unit 102. Specifically, fitted on and fixed to the outer periphery of the inner ring member 106 as the rotary ring via a mounting member 131 having an L-shaped cross-section, the polarized pulsar ring 132 is co-rotatable with the inner ring member 106. The polarized pulsar ring 132 constitutes a target (an object to be detected)

of the sensor 133. Multiple N and S magnetic poles (not shown) are alternately provided on the circumference of the ring 132.

On the other hand, the sensor 133 is installed in the roller bearing unit 102 by means of the cover 112 that is provided with a sensor-mounting function in addition to the inherent function of closing off the bearing interior. The sensor 133 is provided with a sensor body 133a containing a magnetic detection element such as a hall element, and a supporting member 133b on which the sensor body 133a is integrally mounted for supporting the sensor body 133a. In the sensor 133, as described later, the sensor body 133a and-supporting member 133b are mounted on the sensor mount 112b of the cover 122, by which the magnetic detection surface of the sensor body 133a faces the N and S magnetic poles of the polarized pulsar ring 132 at a specific distance. In the sensor unit 103, when the polarized pulsar ring 132 is rotated in association with the rotation of the bearing, the sensor body 133a detects magnetic field changes caused by the polarized pulsar ring 132 corresponding to the bearing rotation and outputs detection signals to an un-shown controller such as an ECU, by which the rotation number of the roller bearing unit 102 and the wheel rotation speed are detected. Besides the sensor unit that detects magnetic field changes, a sensor unit having a sensor body of different sensing system such as electric capacitance system and a corresponding target can be used to detect the rotation number and rotation speed and, additionally, the wheel rotation direction.

Figure 6:
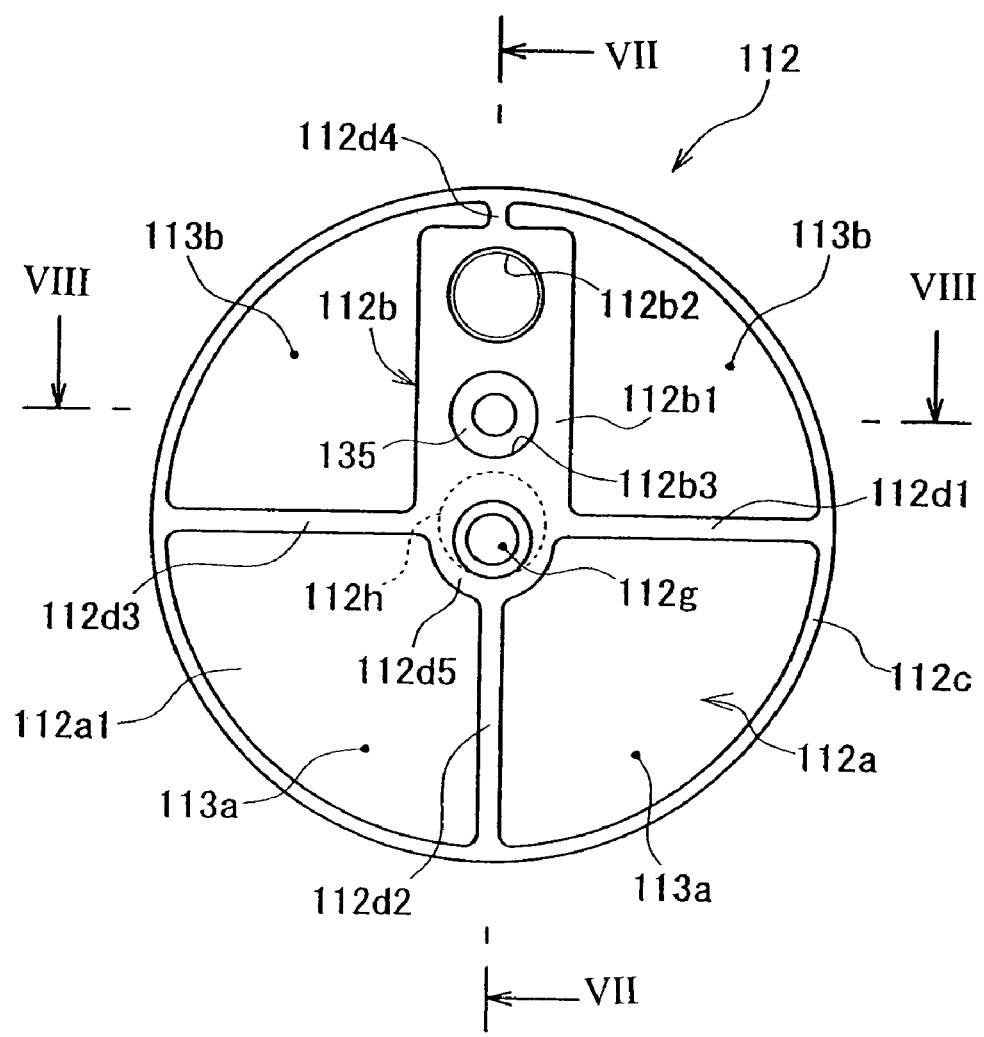
FIG. 6 is a plan view of the cover of FIG. 5 seen from the outer side in the axial direction.
Figure 7:
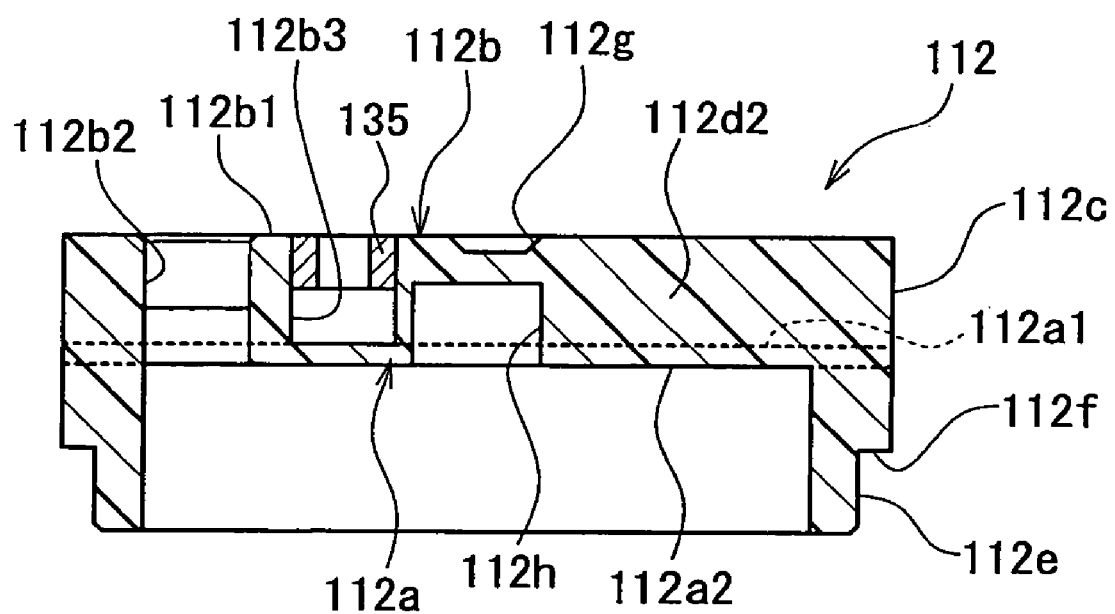
FIG. 7 is a cross-sectional view taken along the line VII-VII in FIG. 6.
Figure 8:
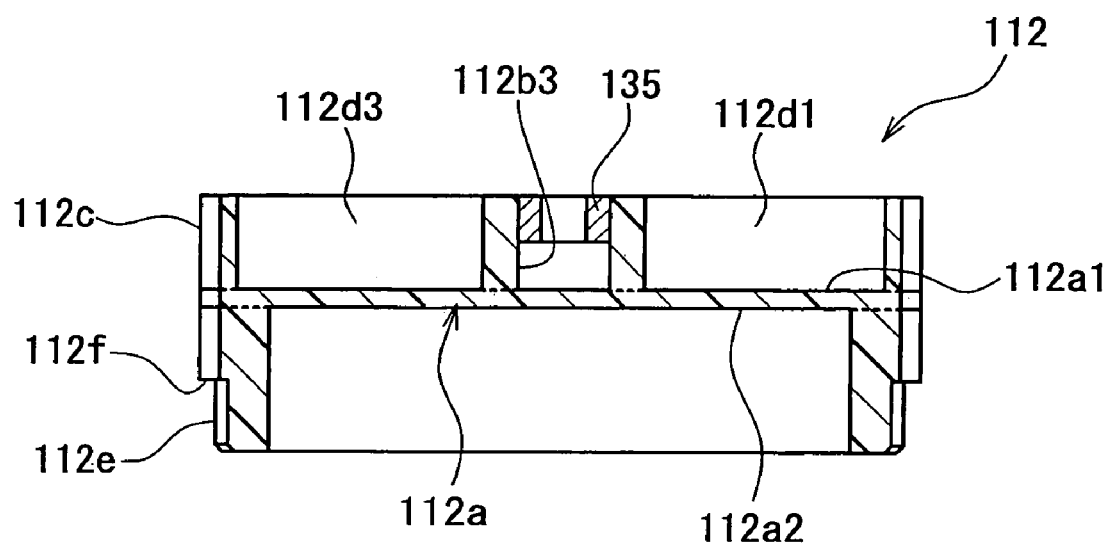
FIG. 8 is a cross-sectional view taken along the line VIII-VIII in FIG. 6.

The cover 112 is made of a synthetic resin such as nylon 66 mixed with glass fibers and formed as one piece by injection molding using a metal mold. As also shown in FIGS. 6 to 8, the cover 112 comprises a partition 112a that partitions the interior of the roller bearing unit 102 from the exterior and a sensor mount 112b having a seating face 112b1 that constitutes a reference level for mounting the sensor 133 (FIG. 5) on the axially outer end face 112a1 of the partition 112a. The cover 112 is provided with a cylindrical part 112c extended axially outward from the axially outer end face 112a1 of the partition 112a and multiple, for example, four, ribs 112d1, 112d2, 112d3, and 112d4 formed on the end face 112a1. The ribs 112d1 to 112d4, sensor-mount 112b, and cylindrical part 112c constitute specific recesses 113a and 113b.

Specifically, the partition 112a is a thin nearly circular member that substantially closes off the bearing interior. In addition to the cylindrical part 112c protruding axially outward, the partition 112a is provided with a circumferentially continued step that is extended axially inward from the axially inner end face 112a2 and ends with an outer periphery 112e and an annular end face 112f. The outer periphery 112e of the cover 112 is pressed in the outer ring 104 against inner periphery 104c (FIG. 5), by which the cover 112 is attached to the roller bearing unit 102 in the manner that the outer periphery 112e and inner periphery 104c is pressed against each other and the annular end face 112f is pressed against the axial end face 104d of the outer ring 104 (FIG. 5), thereby the partition 112a faces and closes off the bearing interior. Here, the inner periphery 104c of the outer ring 104 is provided with a flange on the outer side of the outer periphery. An un-shown knuckle contained in the vehicle suspension is fixed to the outer ring 104. Although the mounting strength and fitting force required for the outer ring 104 is ensured, the step consisting of the outer periphery 112e and annular end face 112f is thin enough to prevent the step from becoming deformed in the course of producing the cover 112.

The sensor mount 112b is provided with a rectangular parallel-piped shape continued from the axially outer end face 112a1 of the partition 112a. The sensor mount 112b is provided with a flat seating face 112b1 constituted by the axially outer surface of the mount 112b itself, a through-hole 112b2 of which one and the other openings are formed in the seating face 112b1 and in the axially inner end face 112a2 of the partition 112a, respectively, and through which the sensor body 133a (FIG. 5) is inserted, and a placing hole 112b3 that opens to the seating face 112b1 and in which a nut 135 is placed. The nut 135 is previously introduced in the placing hole 112b3 and buried therein by insert molding in the course of producing the cover 112 by molding. A bolt 134 (FIG. 5) is threaded in the nut 135 with the surface of the supporting member 133b (FIG. 5) abutting the seating face 112b1, by which the sensor 133 (FIG. 5) is mounted on the cover 112 with the magnetic detection surface of the sensor body 133a introduced in the through-hole 112b2 being at a specific distance from the encoder 132 (FIG. 5). The sensor body 133a is air-tightly introduced in the through-hole 112b2, thereby preventing the sealing property of the partition 112a and, in turn, the cover 112 from deteriorating.

The ribs 112d1 to 112d4 have a thin plate form continued from the axially outer end face 112a1 of the partition 112a. The ribs 112d1 to 112d4 integrate the sensor mount 112b and cylindrical part 112c on the end face 112a1. In other words, the ribs 112d1 to 112d4 are connected to the inner periphery of the cylindrical part 112c at one end. The ribs 112d1 to 112d3 are connected to the sensor mount 112b via a nearly semi-circular rib connection part 112d5 formed continuously from the end face 112a1 at the other end. The other end of the rib 112d4 having a smaller length in the radial direction than the ribs 112d1 to 112d3 is directly connected to the senor mount 112b. On the cover 112, as shown in FIG. 7, the ribs 112d1 to 112d3 and the rib 112d4 connected to the sensor mount 112b are arranged at intervals of 90° around the axis. Further, the recesses 113a having a fan-shape are formed on the end face 112a1 by the cylindrical part 112c, rib 112d1, rib 112d2, and rib connection part 112d5 and by the cylindrical part 112c, rib 112d2, rib 112d3, and rib connection part 112d5. The recesses 113b having a nearly fan-shape are formed on the end face 112a1 by the cylindrical part 112c, rib 112d1, rib 112d4, and sensor mount 112b and by the cylindrical part 112c, rib 112d3, rib 112d4, and sensor mount 112b. Recesses 112g and 112h provided on the axially outer surface of the rib connection part 112d5 and the axially inner end face 112a2 of the partition 112a, respectively, result from positioning projections provided in the metal mold, which help to form the parts of the cover 112 with accuracy using the metal mold.

As described above, in the cover 112 and roller baring unit 102 of this embodiment, the ribs 112d1 to 112d4 and rib connection part 112d5 are provided to form the recesses 113a and 113b on the axially outer end face 112a1 of the partition 112a where the sensor mount 112b having the seating face 112b1 is provided, leading to a reduction in the amount of synthetic resin on the end face 112a1 on which the seating face 112b1 is formed. This consequently prevents the seating face 112b1 of the sensor mount 112b from being deformed due to thermal contraction of the synthetic resin in the course of producing the cover 112 by molding. Unlike the prior art embodiment, a highly accurate seating face 112b1 can be easily formed without any post-processing such as cutting. The seating face 112b1 that constitutes a reference level for mounting the sensor 133 can be formed with high accuracy, preventing the assembly accuracy of the polarized pulsar ring 132 and sensor body 133a from deteriorating and, therefore, preventing the sensor detection results from deteriorating due to the deteriorated assembly accuracy. Furthermore, the lack of need for post-processing prevents unnecessary increase in cost to produce a lightweight cover 112.

In the above description, the seating face of the sensor mount, ribs, and recesses are formed on the axially outer end face of the partition. The present invention is not restricted in the number and shape of the ribs and recesses to the embodiment described above as long as the seating face that constitutes a sensor mounting reference level is formed on one of the inner and outer end faces of the partition that partitions the interior of the roller bearing apparatus from the exterior and the ribs are provided on one end face to form the specific recesses on one end face together with the sensor mount. For example, with the elimination of the rib connection part 112d5, the ribs 112d1 to 112d3 can be directly connected to the sensor mount 112b. Alternatively, the end face of the partition within the inner periphery of the cylindrical part is divided into three regions by three ribs and the sensor mount can be provided in one of the three recesses as a separate piece from the ribs. However, as described above, the sensor mount integrated with a rib is preferable in terms of forming a highly accurate seating face without complicating the mold shape. This is also preferable in terms of reinforcing the sensor mount by the ribs and maintaining its shape.

In the above description, the sensor mount 112b and ribs 112d1 to 112d4 provided continuously to the end face 112a1 are arranged within the inner periphery of the cylindrical part 112c. For example, the ribs can be provided above the end face 112a1 at a distance in which one end and the other end in the radial direction are connected to the sensor mount 112b and the cylindrical part 112c, respectively. With the elimination of the cylindrical part 112c, the recesses 113a and 113b can be open at the outer periphery. However, providing the cylindrical part described above is preferable in terms of effectively preventing the ribs and sensor mount from being deformed. This is also preferable in terms of forming a cover that is easy to handle, facilitating mounting to the bearing apparatus.

In the above description, the present invention is applied to a vehicle driven wheel hub unit provided with a double-row angular ball bearing. However, the present invention is not restricted to this and bearing systems including the type and number of rolling elements are not restricted in any way. Specifically, the present invention can be applied to a roller bearing apparatus constituting a vehicle driving wheel hub unit comprising a conical roller and having the interior of the bearing apparatus closed by a cover from vehicle outer side. The present invention can also be applied to a variety of roller bearing apparatuses that are installed in machines such as a rotary machine and equipment other than hub units.

The roller bearing apparatus according to a third aspect of the present invention is described hereafter.

Figure 9:
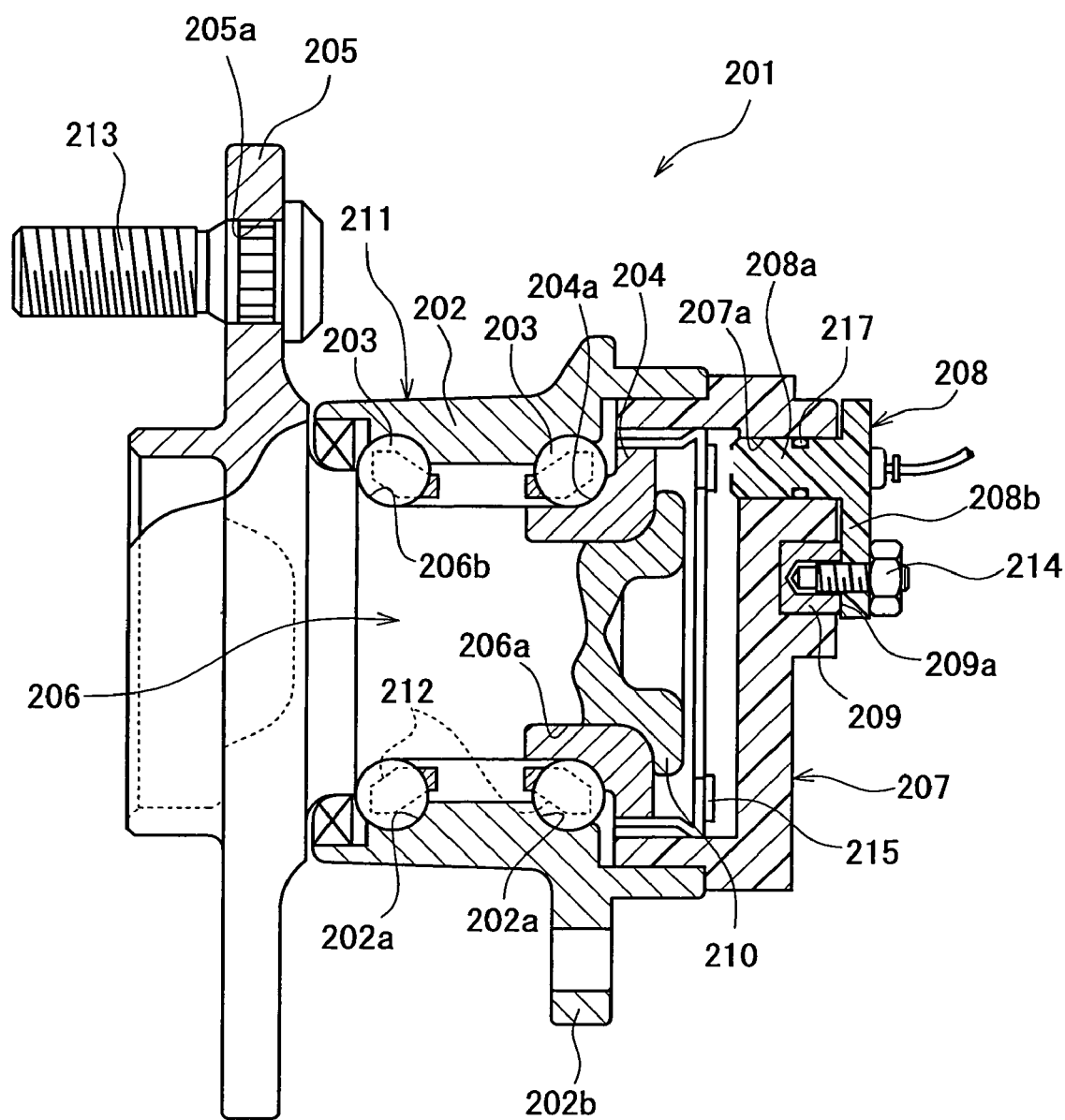
FIG. 9 is a cross-sectional view of a roller baring apparatus according to a third aspect of the present invention to which a sensor is mounted.
Figure 10:
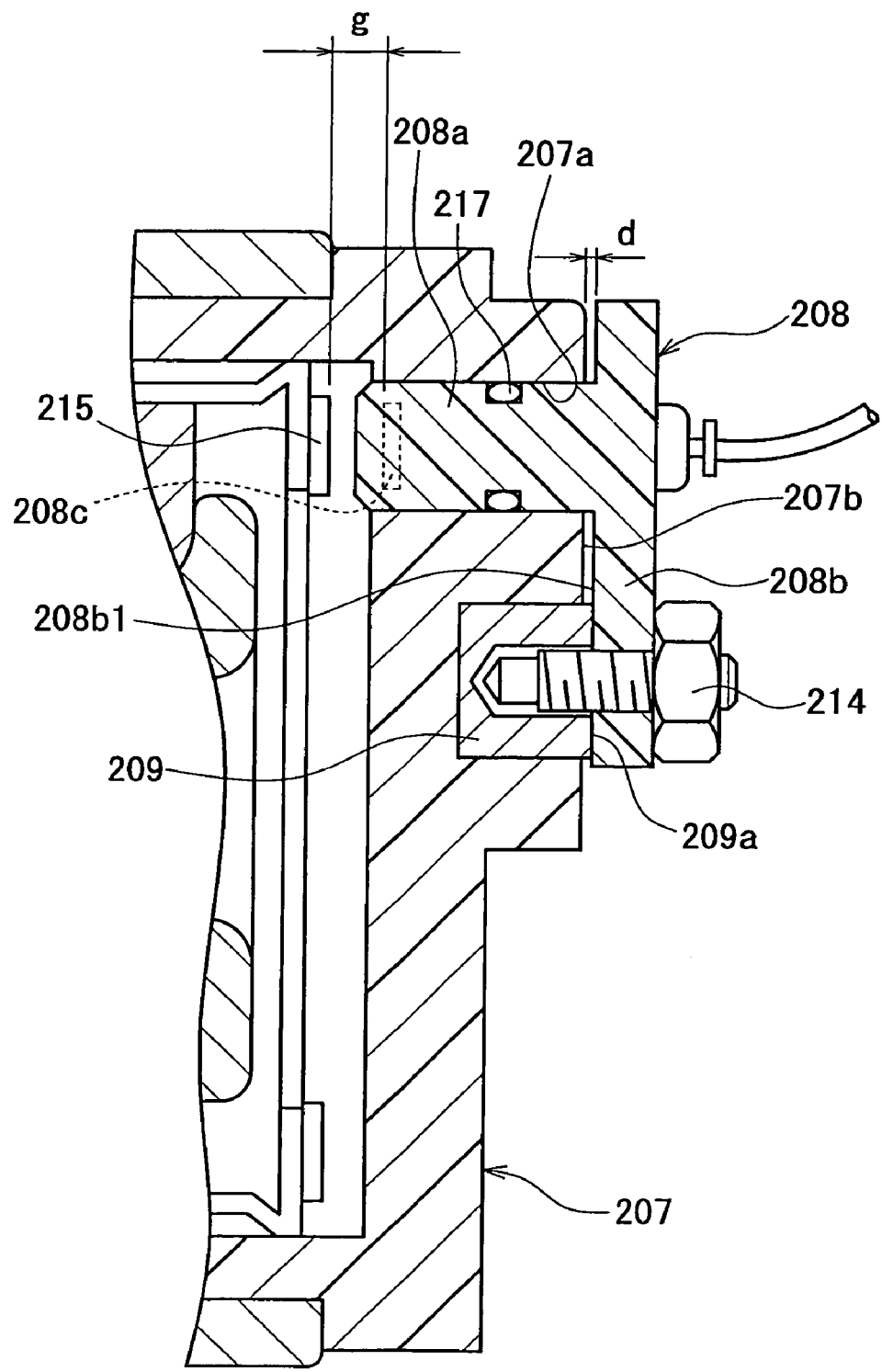
FIG. 10 is an enlarged view of the sensor insertion opening and its surroundings in FIG. 9.
Figure 11:
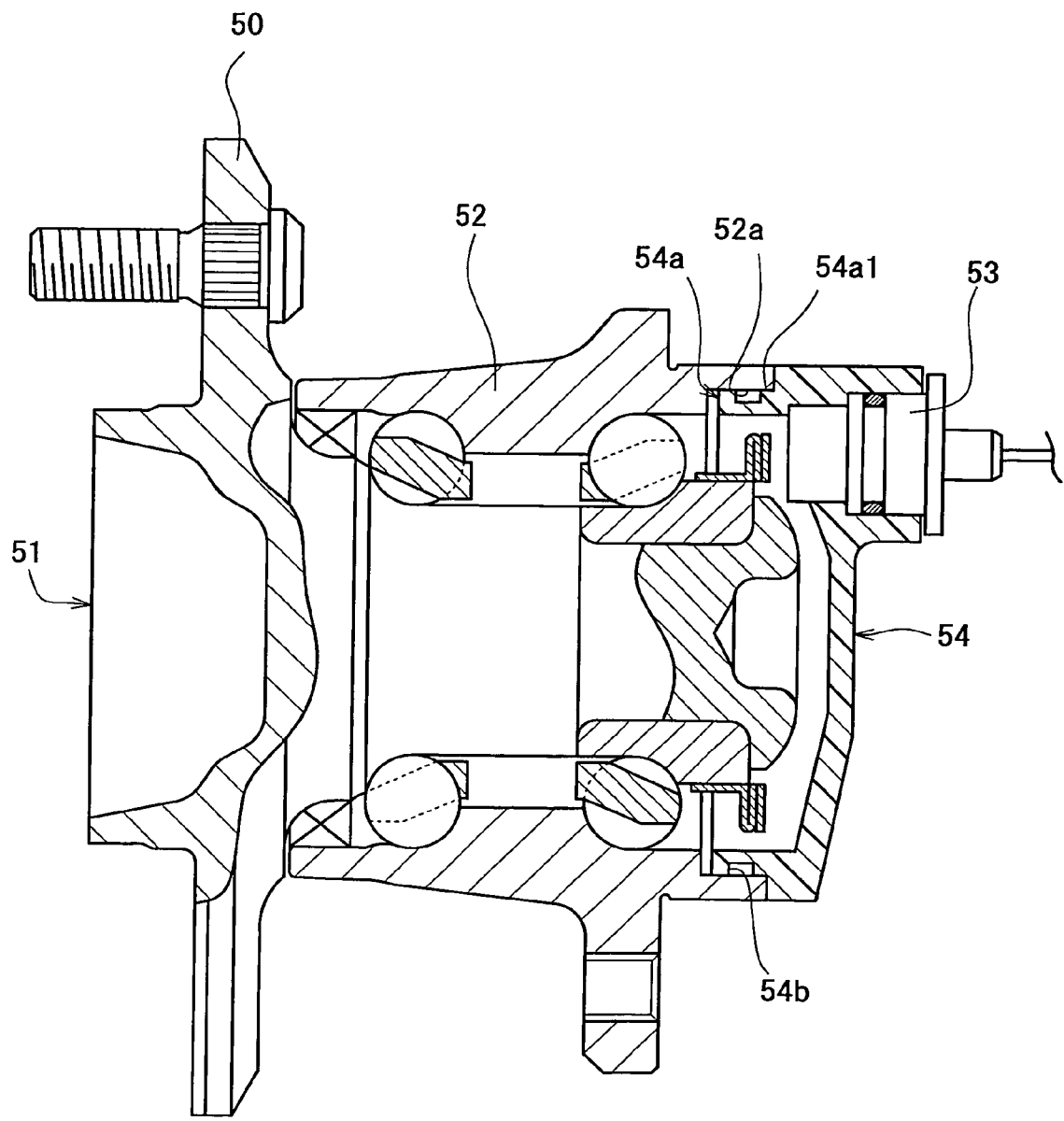
FIG. 11 is an axial cross-sectional view showing the structure of a conventional roller bearing apparatus.

FIG. 9 is a cross-sectional view of a roller bearing apparatus 201 according to a third aspect of the present invention; and FIG. 10 is an enlarged view of the main part in FIG. 9.

In FIGS. 9 and 10, a sensor 208 and a bolt 214 for mounting the sensor 208, which are described later, are provided in a roller bearing apparatus 201. However, the sensor 208 and bolts 214 are excluded from the roller bearing apparatus of the present invention. The roller bearing apparatus 201 comprises an outer ring 202, an inner ring member 204 provided on the inner periphery side of the outer ring 202 via balls 203 as rolling elements, and an inner shaft 206 having the inner ring member 204 attached on the outer periphery and a flange 205 to which a wheel is attached at one axial end. The outer ring 202 has two outer ring tracks 202a and an outer ring flange 202b by which the outer ring 202 is attached to a vehicle body.

The inner ring 204 is fitted on a small-diameter part 206a provided at the other axial end of the inner shaft 206. The inner ring 204 is fixed by a caulked part 210 formed by plastically deforming the other axial end of the inner shaft 206 while being pushed toward the one axial end. Two inner ring tracks facing the two outer ring tracks 202a consists of a first inner ring track 206b formed by the outer periphery of the inner shaft 206 and a second inner ring track 204a formed by the outer periphery of the inner ring 204. In this way, the outer ring 202 having multiple rows of outer ring tracks 202a, inner ring member 204 having the second inner ring track 204a, inner shaft 206 having the first inner ring track 206b, multiple rows of balls 203 interposed between these track surfaces constitute a multiple-row angular ball bearing 211. The flange 205 is provided with a bolt-hole 205a for inserting a bolt 213. An un-shown wheel is fastened to the flange 205 by the bolt 213 inserted in the bolt-hole 205a. Crown-shaped holders 212 maintain the balls 203 in each row at nearly equal intervals in the circumferential direction.

A synthetic resin cover 207 is provided at the other axial end of the outer ring 202. The cover 207 is attached to close the opening. at the other axial end of the outer ring 202, thereby preventing foreign substances from entering the bearing 211. The cover 207 is provided with a sensor insertion opening 207a for inserting the sensor body 208a of a sensor 208 and a cap nut 209 for fixing the sensor 208 by a bolt 214. On the other hand, a pulsar ring 215 as a member for detecting the rotation is provided on the inner ring 204 that co-rotates with an un-shown wheel. The pulsar ring 215 is made by attaching magnetic rubber to an annular carbon steel plate, having N and S poles alternately arranged in the circumferential direction.

The sensor 208 mounted on the roller bearing apparatus 201 is provided with an axially cylindrical sensor body 208a and a sensor flange 208b radially extended at the other axial end of the sensor body 208a. A rotation detection element 208c (shown by the dotted lines in FIG. 10) is embedded in the sensor body 208a at the tip (one axial end). In the vicinity of the pulsar ring 215, the element 208c detects the rotation number of the inner shaft 206 or an un-shown wheel. The rotation number detection system is not restricted to this embodiment and various systems used with a rotary encoder including a photoelectric system can be used.

The cover 207 is formed by injection molding a thermoplastic resin such as reinforced polyamide resin. The cap nut 209 is pre-placed in a metal mold and, then, the resin is poured in the metal mold to embed the cap nut in the cover 207. The cap nut 209 is immobilized with the axial direction of the nut hole being in parallel with that of the bearing apparatus 201. The nut end face 209a is in a plane radially parallel with the other axial end side surface of the cover 207 (including the cover outer surface 207b, described later). The nut end face (the other axial end side face) 209a of the cap nut 209 is exposed on the other axial end side of the cover 207.

As shown in FIG. 10, the cap nut 209 is embedded in the cover 207, protruding on the other axial end side by an axial distance d. Consequently, the nut end face 209a is on the other axis end side of the cover outer surface 207b facing the inner flange surface 208b1 of the sensor flange 208b. Therefore, when the sensor flange 208b of the sensor 208 is fastened by the bolt 214 and cap nut 209, the inner flange surface 208b1 of the sensor flange 208b is in area contact with the nut end face 209a, but not in contact with the cover outer surface 207b. With the bolt being fastened, the sensor 208 is positioned by the nut end face 209a, receiving no influence from the cover outer surface 207b.

When the cover outer surface 207b of the cover 207 is subject to deformation such as warpage or sinkage, the cover outer surface 207b and inner flange surface 208b1 may partially contact each other (hereafter also termed "partial contact"), and the sensor 208 is dominantly positioned by the nut end face 209a, because the nut end face 209a and inner flange surface 208b1 are in are contact with each other with relatively high contact pressure while the cover outer surface 207b and inner flange surface 208b1 are in partial contact with relatively low contact pressure. Therefore, the sensor 208 is less influenced by warpage or sinkage of the cover 207, preventing the sensor 208 from tilting or dislocating.

The axial distance d between the cover outer surface 207b and the inner flange surface 208b1 (see FIG. 10) is preferably 10 to 100 μm and more preferably 20 to 30 μm. When the axial distance d is excessively large, an unnecessarily large space is required. When the axial distance d is excessively small, partial contact between the cover outer surface 207b and inner flange surface 208b 1 as described above may become more influential.

An O ring 217 is provided between the outer periphery of the sensor body 208a and the inner periphery of the sensor insertion opening 207a. Therefore, there is no increase in foreign substances entering the interior of the roller bearing apparatus 201 through the sensor insertion opening 207a because of the axial distance d.

As described above, the cover 207 is formed by pre-placing the cap nut 209 in a metal mold and pouring a synthetic resin in the metal mold. In the molding process, some part of the cap nut 209 should abut the metal mold to immobilize it at a specific position in the metal mold before the synthetic resin is poured in. The cap nut 209 is covered with the synthetic resin except for the nut end face 209a (and a small part of the periphery adjacent to the nut end face 209a). Consequently, the part of the cap nut 209 that abuts the metal mold is the nut end face 209a. Even if the cover 207 suffers from warpage or sinkage after the molding, the nut end face 209a is not dislocated within the metal mold. Therefore, the nut end face 209a is positioned with higher accuracy than the cover outer surface 207b.

When the sensor 208 is axially dislocated or the sensor flange 208b is tilted relative to the radial direction, some errors may be observed in the gap between the element 208c of the sensor 208 and the pulsar ring 215 or a sensor gap g (see FIG. 10), deteriorating the rotation detection accuracy. The present invention improves the accuracy of positioning the sensor 208 and decreases errors in the sensor gap g, thereby improving the rotation detection accuracy of the sensor 208.

What is claimed is:

1. A roller bearing apparatus cover that is a synthetic resin cover formed by molding, closing off the interior of a roller bearing apparatus comprising a fixed ring and a rotary ring, and having a sensor mount on which a sensor can be mounted so as to face an encoder co-rotatably attached to the rotary ring for detecting the movement of the rotary ring,
wherein the cover is provided with a partition that partitions the interior of the roller bearing apparatus from the exterior;
the sensor mount is provided with a seating face constituting a reference level for mounting the sensor on one of the inner and outer end faces of the partition; and
ribs are provided on the one end face to form specific recesses on the one end face together with the sensor mount, the ribs having a plate form continued from the axially outer end face of the partition.

2. The roller bearing apparatus cover according to claim 1, wherein the sensor mount and the ribs are integrally formed on the one end face.

3. The roller bearing apparatus cover according to claim 1, wherein ends of the ribs are connected to the sensor mount via a nearly semi-circular rib connection part formed continuously from the axially outer end face of the partition.

4. The roller bearing apparatus cover according to claim 1, comprises:
the roller bearing apparatus having the fixed ring with a cylindrical opening that opens at one end and the cover that is fitted in the opening against the inner periphery thereof to close the opening, the cover having an inscribing surface that inscribes the inner periphery of the opening and a stepped surface that protrudes radially outward from the inscribing surface to abut the axial end face of the opening,
wherein a beveled part is formed on the axial end face of the opening at the inner rim, and an annular space formed by the beveled part, the inscribing surface, and the stepped surface is filled with a room temperature curing paste sealant.

5. A method of producing the roller bearing apparatus according to claim 4, in which the inscribing surface of the cover is inserted in the cylindrical opening of the outer ring of the roller bearing against the inner periphery of the opening from one axial end to the other to close the opening of the outer ring,
wherein the inscribing surface of the cover is inserted in the opening against the inner periphery with the sealant being applied to the inscribing surface of the cover along the entire circumference of the inscribing surface, the sealant being applied to the inscribing surface in the form of a circumferential ridged streak such that two ends of the ridged streak overlap in the axial direction.

6. The roller bearing apparatus according to claim 4, wherein the sealant is further interposed between the inner periphery of the opening and the inscribing surface.

7. The roller bearing apparatus according to claim 4, wherein the sealant is interposed along the entire circumference of the annular space with no gap.

8. A roller bearing apparatus comprising a fixed ring and a rotary ring, and a synthetic resin cover formed by molding and having a sensor mount on which a sensor can be mounted so as to face an encoder co-rotatably attached to the rotary ring for detecting the movement of the rotary ring,
wherein the cover is provided with a partition that partitions the interior of the roller bearing apparatus from the exterior;
the sensor mount is provided with a seating face constituting a reference level for mounting the sensor on one of the inner and outer end faces of the partition; and
ribs are provided on the one end face to form specific recesses on the one end face together with the sensor mount, the ribs having a plate form continued from the axially outer end face of the partition.

9. A roller bearing apparatus comprising: an outer ring; an inner ring member provided on an inner periphery side of the outer ring via rolling elements; an inner shaft having the inner ring member attached on the outer periphery and a flange for mounting a wheel at one axial end; a detection member provided on the inner ring or the inner shaft, which co-rotates with the wheel, for detecting the rotation; a synthetic resin cover attached to the outer ring at the other axial end; a sensor insertion opening provided through the cover in the axial direction; and a cap nut embedded in the cover with a nut end face exposed for fastening the sensor flange of a sensor to the cover on the other axial end side, wherein the nut end face of the cap nut is positioned on the other axial end side of the outer cover surface facing the sensor flange, and wherein the sensor flange is in area contact with the nut end face, but not in contact with the cover outer surface.

10. The roller bearing apparatus according to claim 9, wherein an inner flange surface of the sensor flange is in area contact with the nut end face, but not in contact with the cover outer surface.

* * * * *